No. 671,420. Patented Apr. 2, 1901.
A. F. HUMPHREY.
ELECTROTHERAPEUTIC SPECTACLES.
(Application filed Jan. 11, 1901.)
(No Model.)
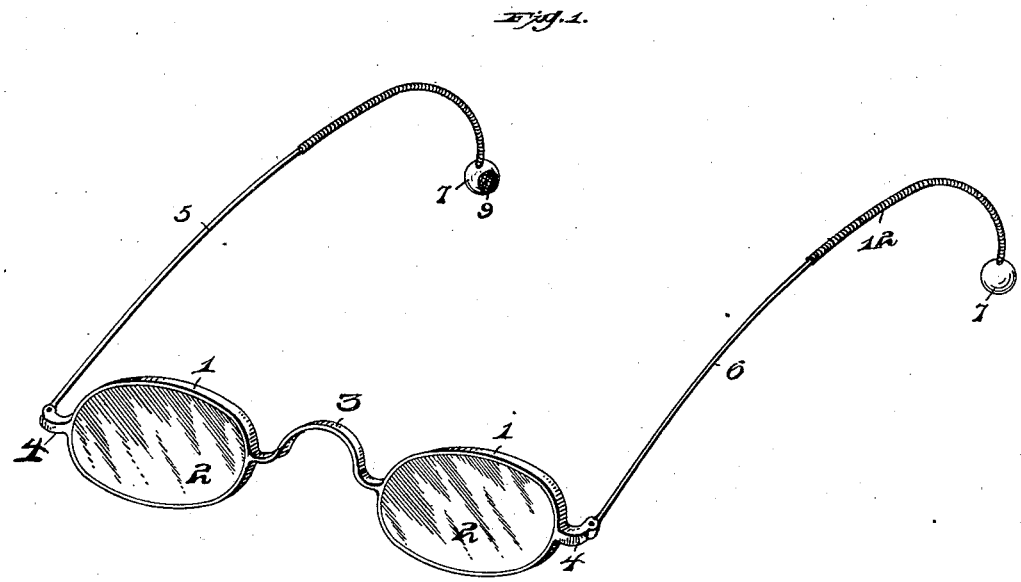
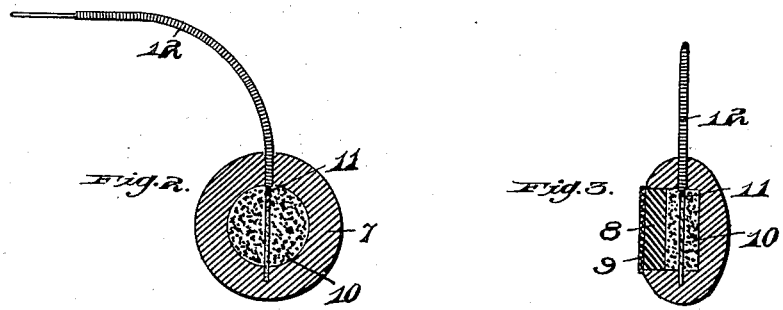
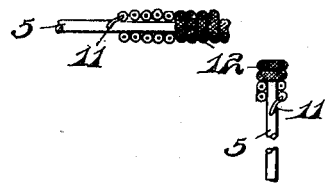
Witnesses:
J. C. Appleman.
E. E. Potter.
Inventor
A. F. Humphrey
By
H. C. Everitt Co.
Attys.
THE NORRIS PETERS CO., PHOTO-LITHO., WASHINGTON, D. C.

UNITED STATES PATENT OFFICE.

ALEXANDER F. HUMPHREY, OF ALLEGHENY, PENNSYLVANIA.

ELECTROTHERAPEUTIC SPECTACLES.

SPECIFICATION forming part of Letters Patent No. 671,420, dated April 2, 1901.

Application filed January 11, 1901. Serial No. 42,854. (No model.)

*To all whom it may concern:*

Be it known that I, ALEXANDER F. HUMPHREY, a citizen of the United States of America, residing at Allegheny, in the county of Allegheny and State of Pennsylvania, have invented certain new and useful Improvements in Electrotherapeutic Spectacles, of which the following is a specification, reference being had therein to the accompanying drawings.

This invention relates to certain new and useful improvements in electrotherapeutic spectacles, and has for one object to embody in spectacles electrical positive and negative elements at points distant from each other, so as to generate a slight stimulating-current of electricity to be conveyed through the aural nerves and other nerves located adjacent to the bridge of the nose to the optic nerve to impart strength to the latter nerve.

It is a further object of my invention to accomplish the above result without changing the general contour-lines of the spectacles where these are of the form that have temple-bows extending over the ears of the wearer and to produce this result without in any manner inconveniencing the wearer.

The invention consists in the novel construction, combination, and arrangement of parts, as will be hereinafter more specifically described and then particularly pointed out in the claims, and in describing the invention in detail reference will be had to the accompanying drawings, forming a part of this specification, and wherein like numerals of reference will be employed to designate like parts throughout the several views, in which—

Figure 1 is a perspective view of a pair of spectacles constructed in accordance with my invention. Fig. 2 is an enlarged sectional view of one of the batteries carried by the terminal end of the temples, showing a part of the temple and the insulating-wrapping thereon. Fig. 3 is a like view taken on a different sectional line through the battery. Fig. 4 is an enlarged detail view of a part of one of the temples, showing the manner in which the same is wrapped to insulate this temple from the head of the wearer.

In the drawings the numeral 1 designates the usual lens-frames with the lenses 2 therein, the frames being connected by the usual form of bridge 3 and each frame having the ordinary temple-connecting end pieces 4. The lens-frames, bridge, and temple-connecting end pieces may be constructed of any suitable conducting material, and connected to one of the end pieces 4 is a temple 5, preferably constructed of copper, and to the other end piece a similar form of temple 6, preferably composed of zinc. Each temple is bowed at the free end to pass behind the ears of the wearer, the terminal of one temple acting as the positive pole and the terminal of the other temple acting as the negative pole. To each terminal is secured a knob 7, which may be composed of any suitable insulating material and is provided with a central cavity, which is open at the inner face of the knob. In the opening in the inner face of the knob is fitted a block 8, composed of any porous material that will absorb water, this block having secured to its outer face a thin pad of felt, wool, or like material 9. The cavity within the knob and through which the terminal end of the temple passes is filled with salts, sal-ammoniac, acetic acid, or the like, as shown at 10, and where salts, sal-ammoniac, or like substance is employed I preferably also employ a few grains of crushed coke around the copper wire to prevent the salts or sal-ammoniac in crystallization from adhering to the wire forming the temple. These knobs form the batteries, and the generated current passes from the positive battery through the head of the wearer to the negative battery, over the temple of this negative battery to the lens-frame and bridge-piece, and over the temple of the positive battery to the latter.

In order to insulate the temples from the head and face of the wearer, I provide these terminals at their bowed portions, where they engage the head or face of the wearer, with a fine wire 11, having a covering, such as silk or the like, as indicated at 12.

For illustration we will assume that the battery and copper temple, to which it is attached, form the positive element of the present electrical combination and the opposite battery and zinc temple form the negative element. When the electrical action is set up by the perspiration or aciduous exudation from the head, so as to act upon the cells of the batteries, the current from the positive element passes through the head of the wearer to the negative element, over the temple 6 to the lens-frame, through this lens-frame and the bridge-piece 3 to the temple 5, and back to the positive element or battery.

Having fully described my invention, what I claim as new, and desire to secure by Letters Patent, is—

1. As an improved article of manufacture, electrotherapeutic spectacles having temples composed of different metals, and batteries connected to the ends of said temples, substantially as described.

2. In electrotherapeutic spectacles, the combination with the frame composed of conducting material and the bridge also composed of conducting material, of the temples one of which is composed of copper and the other of zinc, and the batteries carried on the terminal ends of said temples, substantially as described.

3. In electrotherapeutic spectacles, a frame and bridge composed of a conducting material, temples connected to the frame, said temples being composed of metals of different coefficiencies, and batteries carried by said temples.

4. In electrotherapeutic spectacles, a frame and bridge composed of conducting material, temples connected to the frame, said temples being composed of metals of different coefficiencies, batteries carried by said temples, and pads carried by said batteries to engage the head of the wearer, as and for the purpose described.

5. In electrotherapeutic spectacles, a frame and bridge composed of conducting material, temples connected to said frame, batteries carried by said temples, and pads carried by said batteries to rest against the head of the wearer, as and for the purpose described.

In testimony whereof I affix my signature in the presence of two witnesses.

ALEXANDER F. HUMPHREY.

Witnesses:
JOHN NOLAND,
E. E. POTTER.